United States Patent [19]

Yano et al.

[11] 4,153,467
[45] May 8, 1979

[54] METHOD OF INK JET PRINTING

[75] Inventors: Hirofumi Yano, Kamakura; Noriaki Okamura; Tsunehiko Toyoda, both of Yokohama, all of Japan

[73] Assignee: Dai Nippon Toryo Co., Ltd., Osaka, Japan

[21] Appl. No.: 744,600

[22] Filed: Nov. 24, 1976

Related U.S. Application Data

[63] Continuation of Ser. No. 563,337, Mar. 31, 1975, abandoned.

[30] Foreign Application Priority Data

Sep. 3, 1974 [JP] Japan .................. 49-101026

[51] Int. Cl.² .............. C09D 11/02; C09D 11/06; C09D 11/10; G01D 15/18
[52] U.S. Cl. .................. 106/20; 106/22; 106/23; 106/27; 346/1; 346/75
[58] Field of Search .............. 106/22, 23, 27, 20

[56] References Cited

U.S. PATENT DOCUMENTS

| 2,130,807 | 9/1938 | Magill et al. | 106/24 |
| 2,525,433 | 10/1950 | Voet et al. | 106/30 |
| 2,684,909 | 7/1954 | Leekley et al. | 106/24 |
| 2,690,973 | 10/1954 | Voet | 106/30 X |
| 2,933,403 | 4/1960 | Toulmin | 106/22 |
| 3,298,030 | 1/1967 | Lewis et al. | 346/75 |
| 3,486,912 | 12/1969 | Dyson | 106/22 |
| 3,519,443 | 7/1970 | Kaplan et al. | 106/22 |
| 3,779,780 | 12/1973 | Dyson | 106/27 |
| 3,846,141 | 11/1974 | Ostergren et al. | 106/22 |

Primary Examiner—Joan E. Welcome
Attorney, Agent, or Firm—Oblon, Fisher, Spivak, McClelland & Maier

[57] ABSTRACT

A method of ink jet printing by injecting ink through a fine nozzle and electrostatically deflecting the ink particles to print a symbol corresponding to a predetermined matrix, the improvement wherein said ink comprises a non-aqueous ink comprising a coloring agent and a mixture of formamide and an aliphatic monohydric alcohol.

7 Claims, 2 Drawing Figures

METHOD OF INK JET PRINTING

This is a continuation of application Ser. No. 563,337, filed Mar. 31, 1975, now abandoned.

BACKGROUND OF THE INVENTION

1. Field of the Invention

The present invention relates to a jet ink composition. Particularly, it relates to a jet printing liquid ink composition to be used for a printer in an ink jet system.

2. Description of the Prior Art

Printing by an ink jet printer involves feeding an ink to a fine nozzle (inner diameter of 10μm - 120μm) made of metal or glass, injecting uniform ink particles from the top of the nozzle and electrostatically deflecting the ink particles by a deflecting electrode disposed in front of the nozzle so as to print a symbol corresponding to a predetermined dot-matrix. The key problems areas of technology for the ink jet printer have concerned the development of methods for dividing the ink in the nozzle into fine ink particles and methods for controlling the injecting direction by a deflection plate or by movement of the nozzle. It is clear that the characteristics of the ink are a critical consideration in these technological areas. Accordingly, the characteristics required for the jet ink composition include stability while being injected as particles by pressure and electrical field, high deflection sensitivity and ease in being discharged from the nozzle under the mutual interaction of ink and nozzle. Moreover, the ink must possess the basic characteristics needed by inks in any printing system, e.g., sufficient fluidity, to prevent closing of the nozzle by drying of the ink in the nozzle.

Conventional jet printing inks are classified as aqueous or nonaqueous. The nonaqueous inks have the disadvantages of low stability of injected ink particles caused by low surface tension. They easily form a mist in the flying step, i.e., under the influence of the electric field. Additionally they have high electrical resistance, i.e., low deflection sensitivity, and low stability of ink particles in a high electric field. Consequently, using them it has been difficult to print clear symbols by conventional apparatus. It would be most desirable to have a nonaqueous ink free from the aforementioned disadvantages.

SUMMARY OF THE INVENTION

Accordingly, it is an object of the present invention to provide an improved nonaqueous jet ink composition which can be injected as stable injected ink particles over a long distance, has high deflection sensitivity, maintains its particle stability in a high electric field and is easily discharged from a nozzle.

Briefly, this and other objects of this invention as will hereinafter be made clear by the ensuing discussion has been attained by providing a jet ink composition comprising a mixture of an aliphatic monohydric alcohol and formamide as one component of a diluent.

BRIEF DESCRIPTION OF THE DRAWINGS

A more complete appreciation of the invention and many of the attendant advantages thereof will be obtained as the same becomes better understood by reference to the following detailed description when considered in connection with the accompanying drawings wherein.

DETAILED DESCRIPTION OF THE PREFERRED EMBODIMENTS

In general, the number of injected ink particles (dots number) is dependent upon the characteristics of the ink in an electric field type ink jet system. Accordingly, the characteristics of stable injection over a long distance, high deflection sensitivity and ease of discharge from a nozzle are important factors for determining the recording speed of the ink. The jet composition of the invention comprises a mixture of a monohydric aliphatic alcohol and formamide as one component of a diluent. The result is an ink which enables excellent printing.

Figure 1:
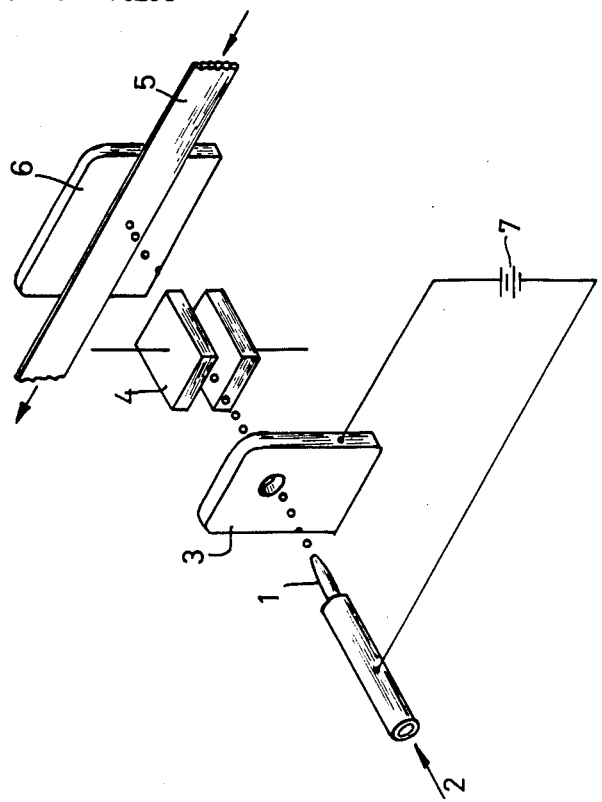
FIG. 1 is a schematic view of an ink jet printer used for evaluating the jet compositions of the invention.

It has long been known that one important factor for determining the final characteristics of jet ink composition is the type of a diluent employed. With this basic principle in mind a series of tests were performed. Jet ink compositions were prepared by adding 1 wt.% of an oil soluble dyestuff to a solvent such as toluene, methylethyl ketone, ethyl acetate, methanol, n-propyl alcohol, diacetone alcohol, formamide, etc. The relationship of the diluent to the injection characteristics of the ink composition were determined by using the ink jet printer shown in FIG. 1. The inks were fed from an ink tank 2 to a nozzle 1 and were discharged in the form of ink particles by application of 2 - 3 Kvolts to plate 3 with a high voltage generator 7. The ink particles are deflected in response to a signal applied to the deflection plate 4. The ink particles are printed on recording paper 5 which is run at a constant speed in front of a target 6. The inner diameter of the nozzle 1 is 100 μ m. The outer diameter thereof is 120 μ m and the static hydraulic pressure of the ink is 25 - 40 cm.

As result of these tests, the parameters of the printing process which resulted in stable injection were determined. Application of the following voltage produced the following dots numbers:

| Solvent | Voltage | Dots Number |
| --- | --- | --- |
| methanol | 1.4 – 1.6 KV | 700–800 dots/sec. |
| n-propyl alcohol | 1.5 – 1.8 KV | 350–900 dots/sec. |
| methylethyl ketone | 1.6 KV | 400 dots/sec. |
| ethyl acetate | 1.5 – 2.9 KV | 500 dots/sec. |
| diacetone alcohol | 1.9 KV | 900 dots/sec. |
| formamide | 2.5 – 2.9 KV | 300–500 dots/sec. |

In all cases the dots number was less than 1,000 dots/sec. Additionally, the particles were unstable under deflection, the distance for stable injection was quite short as compared with that of the aqueous inks and the deflection sensitivity was low. Similar tests have been performed using various other solvents. The results were substantially similar.

As is clear from the tests, a dots number for effective letter printing cannot be obtained by using any single solvent as a diluent for the ink composition. However, as a result of further extensive testing it has been found that when a mixture of formamide and an aliphatic monohydric alcohol is used as at least one component of a diluent together with a coloring agent and a vehicle, a jet ink composition having excellent characteristics is produced. The ink is easily controllable by deflection and its particles have high stability.

Suitable aliphatic monohydric alcohols for use in the invention include methyl alcohol, ethyl alcohol, n-propyl alcohol, isopropyl alcohol, n-butyl alcohol, sec-butyl alcohol, tert-butyl alcohol, isobutyl alcohol, n-amyl alcohol, iso-amyl alcohol, hexyl alcohol, heptyl alcohol, octyl alcohol, or a mixture thereof. It is especially preferable to ue a C1-8 aliphatic monovalent alcohol. The ratio of the amount of formamide to the amount of aliphatic monohydric alcohol should be 1 – 99 : 99 – 1, preferably 30 – 80 : 70 – 20, especially 40–80 : 60–20 by weight. That is, it has been found that the dots number of either formamide or an aliphatic monohydric alcohol can be remarkably increased by adding a small amount of formamide to the aliphatic monohydric alcohol or by adding a small amount of the aliphatic monohydric alcohol to formamide. The object of the invention can be attained by mixing the two ingredients in any desirable proportion within the limits herein specified.

It is also possible to add a diluent in the composition of this invention. Suitable diluents include hydrocarbons such as hexane, heptane, octane, decane, cyclopentane, cyclohexane, benzene, toluene, xylene and ethyl benzene; holohydrocarbons such as carbon tetrachloride, ethylenedichloride, trichloroethylene, tetrachloroethane and dichlorobenzene; ether type solvents such as butyl ether, ethyleneglycol diethyl ether, ethyleneglycol monoethyl ether, ethyleneglycol monobutyl ether; ketone type solvents such as acetone, methylethyl ketone, methyl propyl ketone, methyl isobutyl ketone, methyl amyl ketone, cyclohexanone; ester type solvents such as ethyl formate, methyl acetate, propyl acetate, butyl acetate, phenyl acetate, ethyleneglycol monoethyl ether acetate, methyl propionate and alcohol type solvents such as diacetone alcohol, etc. Water can be added also.

The efficiency of the invention is decreased by inordinately increasing the amount of the other diluent. Accordingly, the amount of the mixture of formamide and the aliphatic monohydric alcohol must be higher than 10 wt%, preferably higher than 50 wt.% of the total diluent.

Suitable coloring agents include direct dyes (substantive color), acid dyes, base dyes and various oil soluble dyes. The type of dye can be selected depending upon the type of the diluent and the vehicle.

It is possible to add a vehicle and/or other additives such as surfactants. Suitable vehicles used for the invention include drying oils such as linseed oil, tung oil, safflower oil, soybean oil and dehydrated castor oil; semi-drying oils such as cotton seed oil, and rape oil; non-drying oils such as castor and olive oil; aliphatic acids and esters thereof such as oleic acid, linoleic acid, pelargonic acid, capric acid, ethyl trideanate, and methyl laurate; dicarboxylic esters such as dimethyl phthalate, diethyl phthalate, dibutyl phthalate, butylbenzene phthalate, dioctyl phthalate, diocytl adipate, dioctyl sebacate, dibutyl sebacate, monomethyl adipate and monoethyl pimelate: polyhydric alcohols such as ethyleneglycol, polyethyleneglycol, diethyleneglycol, propyleneglycol, glycerine, dipropylene glycol and esters and ethers such as diethyleneglycol monobutyl ether, dipropyleneglycol monoethyl ester, etc. It is also possible to use liquid resins having molecular weights of lower than 2,000, such as polyester resins epoxy resins and polybutadiene resins.

An jet ink confusition containing a mixture of formamide and an aliphatic monohydric alcohol produces a dots number which is remarkably increased. Printing speed is also improved by using a diluent containing the mixture, as compared with the conventional nonaqueous inks. Because of excellent electrostatic characteristics, easy deflection control, and increase of stability of ink particles, the ink composition is highly suitable for use in an ink jet printer as well as an electric field type printer.

Having generally described the invention, a more complete understanding can be obtained by reference to certain specific examples which are included for purposes of illustration only and are not intended to be limiting unless otherwise specified.

EXAMPLE 1

Figure 2:
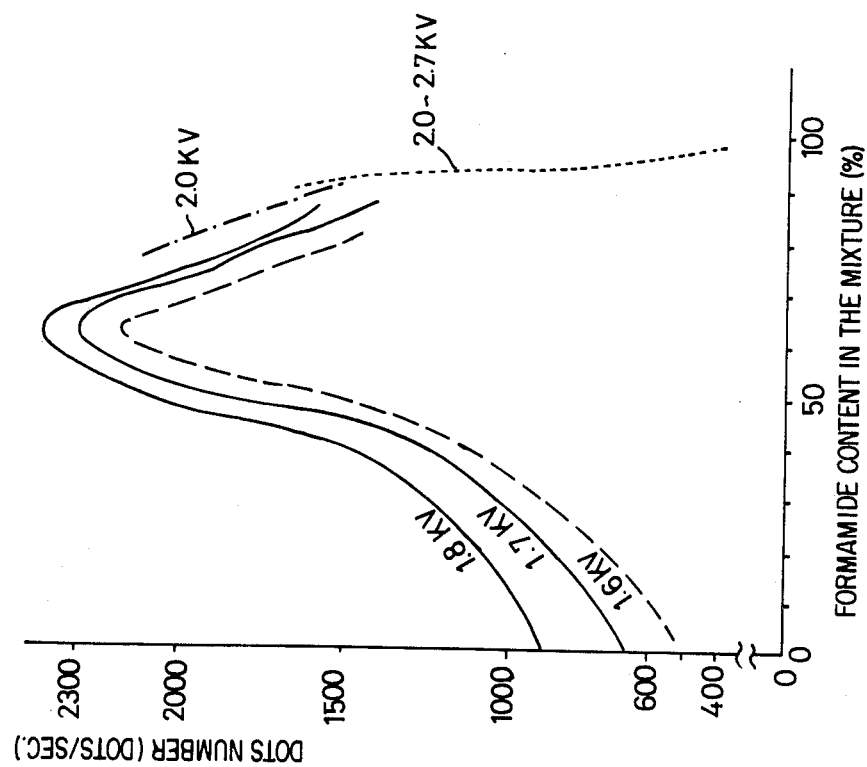
FIG. 2 is a characteristic chart showing injection characteristics of mixtures of formamide and n-propyl alcohol.

Dots numbers were measured as a function of the formamide content by injecting a mixture of formamide and n-propyl alcohol containing 1 wt.% of an oil soluble dye (C.I. Solvent Red 82). The results are shown in FIGS. 2. As is clear from FIG. 2, the dots number of the mixture of formamide and n-propyl alcohol was higher than that of either formamide or n-propyl alcohol alone. It was quite high in the range of formamide content of 30 – 80%. As shown in FIG. 2, the required focusing voltage became higher as the formamide content increased. In order to stably inject the ink when the formamide content is higher than 80%, stable voltages and compositions should be carefully selected.

Example 2

| | |
|---|---|
| Oil soluble dye (C.I. Solvent Red 82) | 1 wt. part |
| Anhydrous caster oil | 30 wt. part |
| n-propyl alcohol | 29 wt. part |
| Formamide | 40 wt. part |

The jet ink composition prepared by mixing the above mentioned components had a viscosity of 8.2 cp; a special resistance of $3.1 \times 10^5 \Omega$ cm and a surface tension of 38 dyne/cm. The composition had excellent properties in the injection state and a dots number of 1900 – 2300 dots/sec. under 1.7 – 1.9 Kvolts.

Example 3

| | |
|---|---|
| Oil soluble dye (C.I. Solvent Yellow 61) | 1 wt. part |
| Anhydrous castor oil | 30 wt. part |
| n-Butanol | 20 wt. part |
| Formamide | 30 wt. part |
| Xylol | 19 wt. part |

The jet ink composition prepared by mixing the above-mentioned components had a viscosity of 6.3 cp; a specific resistance of $2.3 \times 10^7 \Omega$ cm and a surface tension of 28 dyne/cm. The composition had excellent properties in the injection state and a dots number of 1600 – 1900 dots/sec. under 1.6 – 1.9 Kvolts.

Example 4

| | |
|---|---|
| Oil soluble dye (C.I. Solvent Yellow 61) | 1 wt. part |
| Di Butyl-Sebacate | 30 wt. part |
| iso-Butanol | 29 wt. part |
| Formamide | 40 wt. part |

The jet ink composition prepared by mixing the above-mentioned components had a viscosity of 6.3 cp; a specific resistance of $4.0 \times 10^5 \Omega$ cm and a surface tension of 34 dyne/cm. The composition had excellent properties in the injection state and a dots number of 1900 – 2350 dots/sec. under 1.7 – 1.9 Kvolts.

Example 5

| | |
|---|---|
| Oil soluble dye (C.I. Solvent Red 82) | 1 wt. part |
| Castor oil | 30 wt. part |
| n-Butanol | 24 wt. part |
| Formamide | 34 wt. part |
| Xylol | 11 wt. part |

The jet ink composition prepared by mixing the above-mentioned components had a viscosity of 6.5 cp; a specific resistance of $2.0 \times 10^5 \Omega$ cm. The composition had excellent properties in the injection state and a dots number of 1700 – 2000 dots/sec. under 1.7 – 1.9 Kvolts.

Example 6

| | |
|---|---|
| Oil soluble dye (C.I. Solvent Red 82) | 1 wt. part |
| Castor oil | 30 wt. part |
| n-Butanol | 10 wt. part |
| Formamide | 10 wt. part |
| Xylol | 49 wt. part |

The jet ink composition prepared by mixing the above-mentioned components had a viscosity of 5.8 cp, a specific resistance of $4.3 \times 10^8 \Omega$ cm. The composition had excellent properties in the injection state and a dots number of 1400–1600 dots/sec. under 1.4 – 1.5 Kvolts.

Example 7

| | |
|---|---|
| Oil soluble dye (C.I. Solvent Red 82) | 1 wt. part |
| Dioctyl adipate | 10 wt. part |
| Methanol | 40 wt. part |
| Formamide | 49 wt. part |

The dots number of the jet ink composition was 1900 – 2200 dots/sec. under 1.7 – 1.9 Kvolts.

Example 8

| | |
|---|---|
| Oil soluble dye (C.I. Solvent Red 82) | 1 wt. part |
| Dibutyl sebacate (C.I. Solvent Red 82) | 20 wt. part |
| Octyl alcohol | 30 wt. part |
| Formamide | 49 wt. part |

The dots number of the jet ink composition was 1700 – 1800 dots/sec. under 1.7 – 1.9 Kvolts.

Example 9

| | |
|---|---|
| Direct dye (C.I. Direct Blue 15 C.I. 24400) | 1 wt. part |
| Glycerin | 10 wt. part |
| Isopropanol | 40 wt. part |
| Formamide | 49 wt. part |

The dots number of the jet ink composition was 1500 – 2300 dots/sec. under 1.7 – 1.9 Kvolts.

Example 10

| | |
|---|---|
| Acidic dye (C.I. acid Red 52 C.I. 45100) | 1 wt. part |
| Glycerin | 10 wt. part |
| Isopropanol | 30 wt. part |
| Formamide | 49 wt. part |
| Water | 10 wt. part |

The dots number of the jet ink composition was 1700 – 2200 dots/sec. under 1.8 – 2.0 Kvolts and the specific resistance was $2.5 \times 10^4 \Omega$ cm.

Example 11

| | |
|---|---|
| Basic dye (C.I. Basic Blue 29) | 1 wt. part |
| Polyethyleneglycol #300 | 10 wt. part |
| Isopropanol | 30 wt. part |
| Formamide | 49 wt. part |
| Water | 10 wt. part |

The dots number of the jet ink composition was 1750 – 2250 dots/sec. under 1.9 – 2.1 Kvolts, and the specific resistance was $6.3 \times 10^4 \Omega$ cm. The jet ink compositions of Examples 10 and 11 had high deflecting sensitivities, i.e., the specific resistances were low.

Reference 1

| | |
|---|---|
| Oil soluble dye (C.I. Solvent Yellow 61) | 1 wt. part |
| Anhydrous castor oil | 30 wt. part |
| n-propyl alcohol | 69 wt. part |

The ink composition prepared by mixing the above-mentioned components had a viscosity of 8.5 cp; a specific resistance of $1.5 \times 10^5 \Omega$ cm and a surface tension of 31 dyne/cm. The composition was injected in its most stable state under 1.5 Kvolts. The dots number was less than 800 dots/sec. and letter printing could not be effected because of the large dots.

Reference 2

| | |
|---|---|
| Oil soluble dye (C.I. Solvent Yellow 61) | 1 wt. part |
| Anhydrous castor oil | 30 wt. part |
| Formamide | 67 wt. part |

The ink composition prepared by mixing the above-mentioned components had a viscosity of 8.0 cp; a specific resistance of $1.5 \times 10^6 \Omega$ cm; and a surface tension of 40 dyne/cm. The composition could not be stably injected and letter printing could not be carried out.

Reference 3

| | |
|---|---|
| Oil soluble dye (C.I. Solvent Yellow 61) | 1 wt. part |
| Anhydrous castor oil | 50 wt. part |
| Mineral spirit | 47 wt. part |

The ink composition prepared by mixing the above-mentioned components had a viscosity of 4.5 cp; a specific resistance of $5.5 \times 10^7 \Omega$ cm; and a surface tension of 27 dyne/cm. The composition could not be injected under 1.6 – 2.3 Kvolts. However, the dots number was only 500 – 700 dots/sec., and letter printing could not be effected because of the large particles.

Example 12 – 26

In accordance with the process of Example 1, except using the components stated in the Table, each jet ink composition was prepared. A dots number for each case was measured.

Obviously, numerous modifications and variations of the present invention are possible in light of the above teachings. It is therefore to be understood that within the scope of the appended claims the invention may be practiced otherwise than as specifically described herein.

TABLE

| Example | n-propyl alcohol | Formamide | other diluents | coloring agent | vehicle | dots number (dots/sec.) |
|---|---|---|---|---|---|---|
| 12 | 32 | 48 | — | oil soluble dye (C.I. Solvent Red 82) | linseed oil 20 | >2000 |
| 13 | 32 | 48 | — | " | cottonseed oil 20 | " |
| 14 | 32 | 48 | — | " | castor oil 20 | " |
| 15 | 32 | 48 | — | " | dibutyl phthalate 20 | " |
| 16 | 32 | 48 | — | " | dioctyl adipate 20 | " |
| 17 | 32 | 48 | — | " | oleic acid 20 | " |
| 18 | 32 | 48 | — | " | capric acid 20 | " |
| 19 | 32 | 48 | — | direct dye (C.I. direct black 38)1 | diethyleneglycohol 20 | " |
| 20 | 32 | 48 | — | oil soluble dye (C.I. Solvent Red 82)1 | methyl laurate 20 | " |
| 21 | 32 | 48 | — | " | methyl adipate 20 | " |
| 22 | 24 | 36 | toluene 20 | oil soluble dye (C.I. Solvent Red 82)1 | dioctyl adipate 20 | >1500 |
| 23 | 24 | 36 | butyl ether 20 | " | dioctyl adipate 20 | " |
| 24 | 24 | 36 | trichloroethylene 20 | " | dioctyl adipate 20 | " |
| 25 | 24 | 36 | butyl acetate 20 | " | dioctyl adipate 20 | " |
| 26 | 24 | 36 | methyl isobutyl ketone 20 | " | dioctyl adipate 20 | " |

What is claimed as new and desired to be secured by letters Patent of the United States is:

1. In a method of ink jet printing which comprises injecting ink through a fine nozzle and electrostatically deflecting the resulting ink particles to print a symbol which corresponds to a predetermined matrix, the improvement wherein said ink is a non-aqueous ink which comprises a coloring agent and a mixture of formamide and an $C_1$-$C_8$ aliphatic monohydric monovalent alcohol, wherein the weight ratio of formamide to aliphatic alcohol is 40–80 to 60–20.

2. The ink jet printing method of claim 1, wherein the total amount of the mixture of formamide and aliphatic monohydric alcohol in said ink is greater than 10 wt.% of the total diluent.

3. The ink jet printing method of claim 1, wherein said ink further contains a vehicle selected from the group consisting of drying oils, semi-drying oils, non-drying oil, aliphatic acids and esters thereof, dicarboxylic esters and polyhydric alcohols.

4. The ink jet printing method of claim 1, wherein said ink further contains a dye selected from the group consisting of direct dyes, acid dyes, basic dyes and oil soluble dyes.

5. The ink jet printing method of claim 1, wherein said $C_1$-$C_8$ aliphatic monohydric monovalent alcohol is selected from the group consisting of methyl alcohol, ethyl alcohol, n-propyl alcohol, isopropyl alcohol, n-butyl alcohol, sec-butyl alcohol, tert-butyl alcohol, isobutyl alcohol, n-amyl alcohol, iso-amyl alcohol, hexyl alcohol, heptyl alcohol, octyl alcohol, and mixtures thereof.

6. The ink jet printing method of claim 1, wherein said ink further contains at least one diluent selected from the group consisting of hydrocarbons, halohydrocarbons, ethers, ketones, esters and alcohols.

7. The method of claim 2, wherein said amount is greater than 50 wt.%

* * * * *